(12) United States Patent
Butlin, Jr. et al.

(10) Patent No.: US 8,579,311 B2
(45) Date of Patent: Nov. 12, 2013

(54) WHEEL MASS DAMPER ASSEMBLY

(75) Inventors: Albert H. Butlin, Jr., Beverly Hills, MI (US); Vincent A. Bommarito, Grosse Pointe, MI (US); James F. Collins, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 13/105,975

(22) Filed: May 12, 2011

(65) Prior Publication Data
US 2012/0286493 A1 Nov. 15, 2012

(51) Int. Cl.
*B60G 15/00* (2006.01)
(52) U.S. Cl.
USPC .. 280/124.145; 267/90; 267/136; 267/140.11
(58) Field of Classification Search
USPC ......... 280/124.145; 267/90, 195, 136, 140.11
See application file for complete search history.

(56) References Cited

U.S. PATENT DOCUMENTS

| | | | | |
|---|---|---|---|---|
| 4,630,805 A * | 12/1986 | Taylor | ......................... | 267/64.13 |
| 5,120,031 A * | 6/1992 | Charles et al. | ................ | 267/220 |
| 5,244,190 A * | 9/1993 | Bianchi | ......................... | 267/195 |
| 5,385,219 A * | 1/1995 | Snell | .............................. | 188/378 |
| 5,501,434 A * | 3/1996 | McGuire | .................. | 267/140.11 |
| 5,510,985 A * | 4/1996 | Yamaoka et al. | ............... | 701/37 |
| 5,944,763 A * | 8/1999 | Iwasaki | ............................ | 701/37 |
| 6,202,993 B1 * | 3/2001 | Wilms et al. | .................. | 267/136 |
| 6,364,078 B1 | 4/2002 | Parison et al. | | |
| 7,287,611 B2 | 10/2007 | Nagaya | | |
| 7,770,677 B2 | 8/2010 | Takenaka | | |
| 8,296,009 B2 * | 10/2012 | Kajino | ............................ | 701/38 |
| 2006/0290038 A1 * | 12/2006 | Knaust et al. | ................. | 267/136 |
| 2008/0018030 A1 * | 1/2008 | Kiriyama | ................. | 267/140.11 |
| 2009/0050736 A1 * | 2/2009 | Bennett et al. | ............ | 244/102 R |

* cited by examiner

*Primary Examiner* — Toan To
(74) *Attorney, Agent, or Firm* — Quinn Law Group, PLLC

(57) ABSTRACT

A damper mass damper assembly includes a rod, and a casing disposed annularly about the rod and defining a primary fluid chamber therebetween. The rod includes an annular wall that defines a first and a second expansion chamber disposed at a first and a second end of the rod respectively. The rod further defines a first and a second expansion port connecting the first and the second expansion chambers respectively with the primary fluid chamber in fluid communication. As fluid within the primary fluid chamber expands from heating, the fluid may weep into the first and/or second expansion chambers through the first and/or second expansion ports respectively to maintain the integrity of a first and second cap bearing seal, which seal the fluid within the primary fluid chamber.

18 Claims, 3 Drawing Sheets

WHEEL MASS DAMPER ASSEMBLY

TECHNICAL FIELD

The invention generally relates to a wheel assembly for a vehicle, and more specifically to a damper assembly for damping vertical movement of the wheel assembly.

BACKGROUND

Vehicular wheel assemblies are generally rotatably supported by and attached to a knuckle. The knuckle is pivotably attached to a frame of a vehicle. Other suspension components, such as a lower control arm, may also connect the knuckle to the frame, and are pivotably moveable relative to the frame and with the knuckle to accommodate vertical travel of the wheel assembly during operation. A primary damper, i.e., a shock absorber, typically interconnects one of the knuckle or the control arm to the frame and operates to attenuate vertical travel of the knuckle and the control arm. In addition to the shock absorber, a wheel damper assembly may be attached to the knuckle to further attenuate vertical vibration and/or movement of the wheel assembly.

SUMMARY

A damper assembly for damping movement of a damper mass is provided. The damper assembly includes a rod that extends along a longitudinal axis between a first end and a second end. A casing is disposed annularly about and in sealing engagement with the rod. The casing defines a primary fluid chamber between an interior surface of the casing and the rod. A piston is fixedly attached to the rod. The piston is disposed within and divides the primary fluid chamber. The rod includes an annular wall that extends along the longitudinal axis. The annular wall defines a first expansion chamber that also extends along the longitudinal axis. The rod further defines a first expansion port that extends radially through the annular wall of the rod. The first expansion port connects the first expansion chamber and the primary fluid chamber in fluid communication.

A suspension system for a vehicle is also provided. The suspension system includes a knuckle, a wheel assembly rotatably supported by the knuckle, and a damper assembly coupled to the knuckle. The damper assembly is configured for damping vertical movement of the wheel assembly. The damper assembly includes a rod. The rod extends along a longitudinal axis between a first end and a second end. Each of the first end and the second end of the rod are fixedly attached to the knuckle. A casing is disposed annularly about and in sealing engagement with the rod. The casing defines a primary fluid chamber between an interior surface of the casing and the rod. A fluid is disposed within the primary fluid chamber. The casing is moveable relative to the rod along the longitudinal axis. A mass is attached to and moveable with the casing. A first spring is coupled to the rod. The first spring is configured for opposing movement of the casing and the mass relative to the rod in a first direction along the longitudinal axis. A second spring is coupled to the rod. The second spring is configured for opposing movement of the casing and the mass in a second direction along the longitudinal axis. The first direction is opposite the second direction. A piston is fixedly attached to the rod. The piston is disposed within and divides the primary fluid chamber to define a first portion of the primary fluid chamber and a second portion of the primary fluid chamber. The piston includes at least one fluid passage extending therethrough along the longitudinal axis. The fluid passage connects the first portion and the second portion of the primary fluid chamber in fluid communication. The rod includes an annular wall that extends along the longitudinal axis. The annular wall defines a first expansion chamber and a second expansion chamber. The first expansion chamber extends along the longitudinal axis between the first end of the rod and the piston. The second expansion chamber extends along the longitudinal axis between the second end of the rod and the piston. The rod defines a first expansion port and a second expansion port. The first expansion port extends radially through the annular wall of the rod to connect the first expansion chamber and the first portion of the primary fluid chamber in fluid communication. The second expansion port extends radially through the annular wall of the rod to connect the second expansion chamber and the second portion of the primary fluid chamber in fluid communication. A first pressurized gas device is disposed within the first expansion chamber. The first pressurized gas device is compressible in response to an increase in pressure within the first expansion chamber. A second pressurized gas device is disposed within the second expansion chamber. The second pressurized gas device is compressible in response to an increase in pressure within the second expansion chamber.

Accordingly, as the fluid within the primary fluid chamber expands, due to an increase in temperature for example, the fluid may flow through the first expansion port and/or the second expansion port into the first expansion chamber and/or the second expansion chamber respectively, thereby allowing the expansion of the fluid without damaging the first and/or second cap bearing seal and leaking from the primary fluid chamber. The pressurized air devices within the first expansion chamber and the second expansion chamber provide a compressible cushion to allow the fluid to expand.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
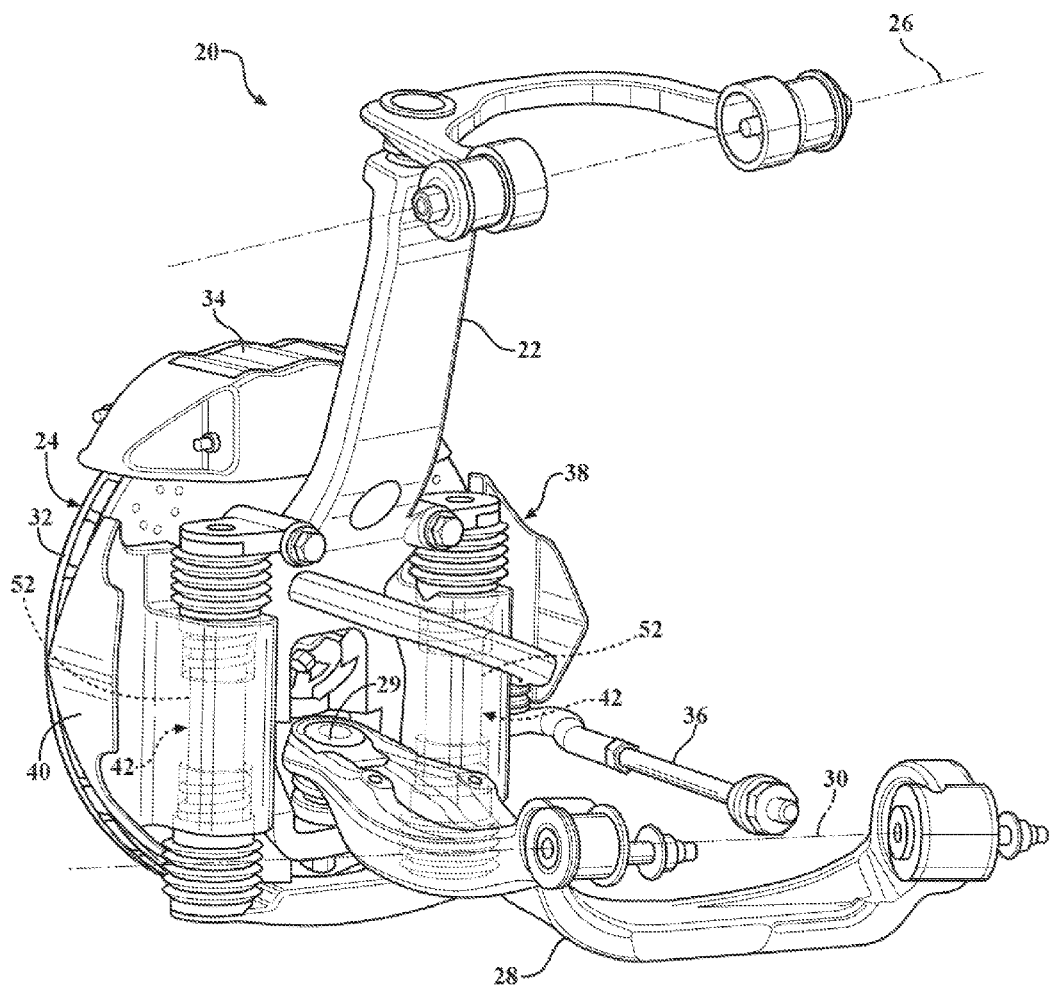
FIG. 1 is a schematic perspective view of a suspension system for a vehicle.

Referring to the Figures, wherein like numerals indicate like parts throughout the several views, a suspension system is generally shown at 20. The suspension system 20 is for a vehicle (not shown). Referring to FIG. 1, the suspension system 20 includes a knuckle 22 that rotatably supports a wheel assembly 24 relative to a frame (not shown) of the vehicle. The knuckle 22 is rotatably attached to the frame for rotation about a first axis 26. A control arm 28 includes a ball joint 29 that pivotably attaches the control arm 28 to the knuckle 22. The control arm 28 is rotatably attached to the frame for rotation about a second axis 30. The control arm 28 supports the knuckle 22 relative to the frame, and cooperates with the knuckle 22 to allow vertical movement of the wheel assembly 24 relative to the frame. The wheel assembly 24 is rotatably attached to the knuckle 22 in any suitable manner, and may include but is not limited to a spindle (not shown), a brake rotor 32 and a brake caliper 34. A tie rod 36 may be attached to the knuckle 22 and connected to a steering system (not shown) of the vehicle. It should be appreciated that the suspension system 20 shown in FIG. 1 is exemplary, and that the knuckle 22, control arm 28 and the wheel assembly 24 may be shaped, sized and/or configured in some other manner not shown or described herein.

The suspension system 20 further includes a damping system 38 coupled to the knuckle 22. The damping system 38 includes a damper mass 40 and a damper assembly 42. The damper assembly 42 is configured for damping vertical movement of the damper mass 40, and thereby for damping vertical movement and/or vibration of the wheel assembly 24.

Figure 2:
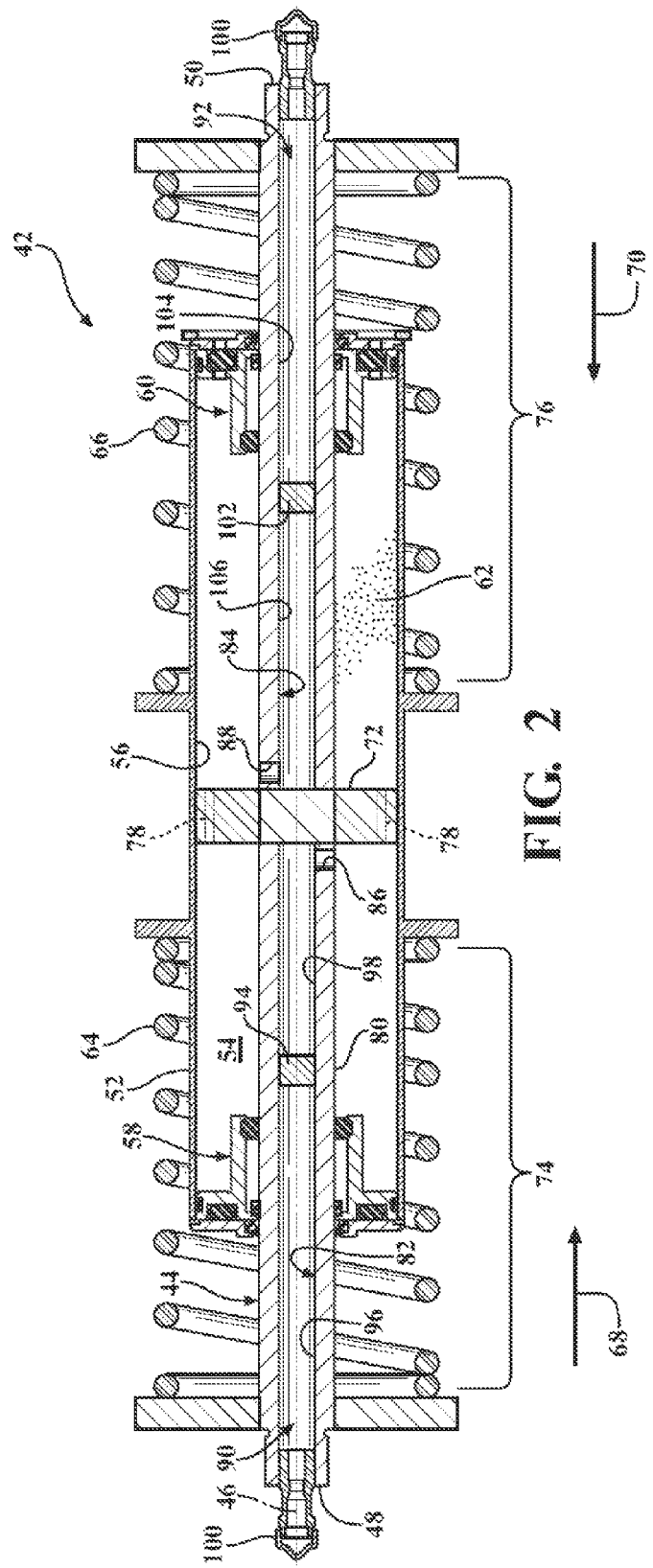
FIG. 2 is a schematic cross sectional view of a damper assembly.

Referring also to FIG. 2, the damper assembly 42 includes a rod 44. The rod 44 extends along a longitudinal axis 46 between a first end 48 and a second end 50. The rod 44 is attached to the knuckle 22 at each of the first end 48 and the second end 50. The rod 44 and the longitudinal axis 46 thereof are disposed in a generally vertical orientation.

A casing 52 is disposed annularly about and in sealing engagement with the rod 44. The casing 52 is moveable relative to the rod 44 along the longitudinal axis 46. The casing 52 defines a primary fluid chamber 54 between an interior surface 56 of the casing 52 and the rod 44. The casing 52 includes a first cap bearing seal 58 and a second cap bearing seal 60. The first cap bearing seal 58 is disposed approximate, i.e., near, the first end 48 of the rod 44. The first cap bearing seal 58 is configured for slideably supporting and sealing the casing 52 relative to the rod 44. The second cap bearing seal 60 is disposed approximate, i.e., near, the second end 50 of the rod 44. The second cap bearing seal 60 is also configured for slideably supporting and sealing the casing 52 relative to the rod 44. The first cap bearing seal 58 and the second cap bearing seal 60 may include any sealing and bearing components necessary to seal the primary fluid chamber 54 relative to the rod 44 and moveably support the casing 52 relative to the rod 44. A fluid 62 is disposed within the primary fluid chamber 54. The fluid 62 may include but is not limited to a high viscosity oil suitable for damping movement between two components.

The damper mass 40 is attached to and moveable with the casing 52. The damper mass 40 may be attached to the casing 52 in any suitable manner. The damper mass 40 may include any suitable weight sufficient to offset vertical movement of the wheel assembly 24. For example, the damper mass 40 may include but is not limited to a weight of approximately 35 Kg. However, the weight of the damper mass 40 may vary for each different application. Vertical movement and/or vibration of the knuckle 22 imparts a vertical movement in the damper mass 40, which transmits the vertical movement to the casing 52. However, because the casing 52 and the damper mass 40 are moveable relative to the rod 44, which supports the damper mass 40 and the casing 52 relative to the knuckle 22, the damper mass 40 and the casing 52 may move vertically relative to the knuckle 22. The damper assembly 42 dampens the vertical movement of the damper mass 40 and the casing 52 to reduce the vibration and/or vertical movement of the knuckle 22, thereby improving driving performance and/or handling of the vehicle.

Figure 3:
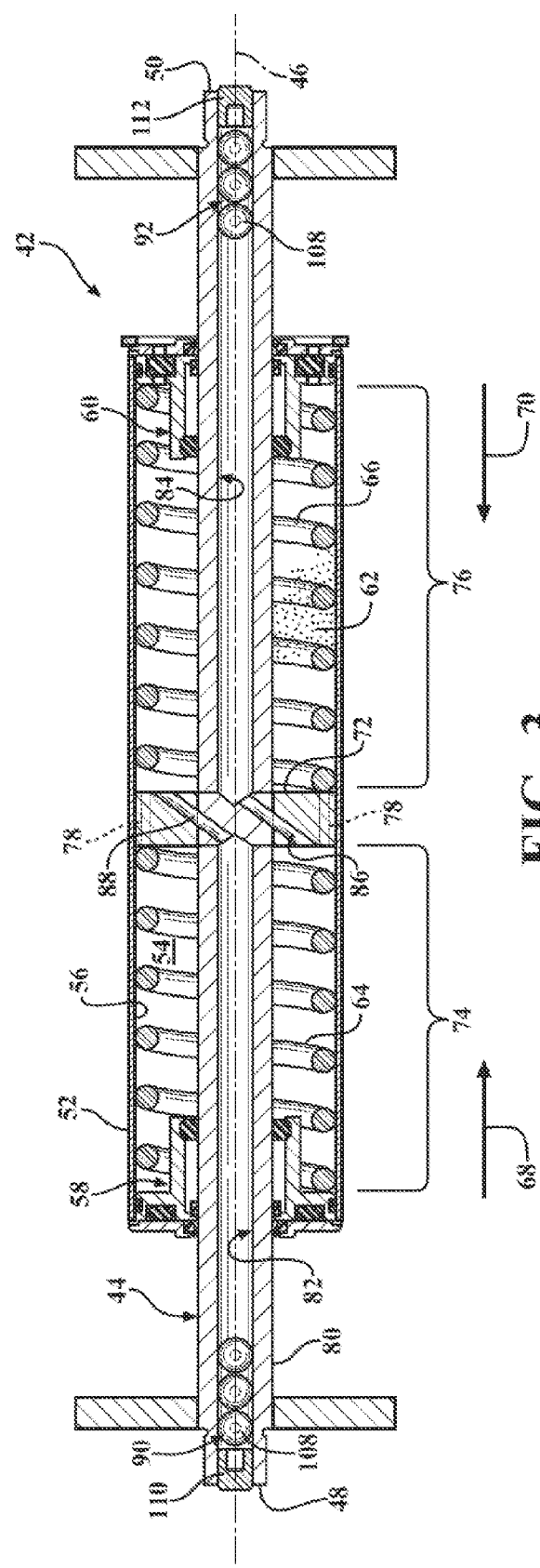
FIG. 3 is a schematic cross sectional view of an alternative embodiment of the damper assembly.

Referring to FIG. 2, the damper assembly 42 includes a first spring 64 and a second spring 66. The first spring 64 is coupled to the rod 44 near the first end 48 of the rod 44. The first spring 64 is configured for opposing movement of the casing 52 relative to the rod 44 in a first direction along the longitudinal axis 46. The first direction is generally indicated by direction arrow 68. The second spring 66 is coupled to the rod 44 near the second end 50 of the rod 44. The second spring 66 is configured for opposing movement of the casing 52 in a second direction along the longitudinal axis 46. The second direction is generally indicated by direction arrow 70. The first direction 68 is opposite the second direction 70. Accordingly, when the damper mass 40 moves toward the first end 48 of the rod 44, the first spring 64 resists the movement of the damper mass 40 and the casing 52. Similarly, when the damper mass 40 moves toward the second end 50 of the rod 44, the second spring 66 resists the movement of the damper mass 40 and the casing 52. As shown in FIG. 2, the first spring 64 and the second spring 66 may be disposed externally of and concentric with the casing 52, i.e., outside the casing 52. However, as shown in FIG. 3, the first spring 64 and the second spring 66 may alternatively be disposed internally of and concentric with the casing 52, i.e., inside the casing 52 within the primary fluid chamber 54 of the casing 52.

A piston 72 is fixedly attached to the rod 44. The piston 72 is disposed within and divides the primary fluid chamber 54. The piston 72 divides the primary fluid chamber 54 to define a first portion 74 of the primary fluid chamber 54 and a second portion 76 of the primary fluid chamber 54. The piston 72 includes at least one fluid passage 78 extending therethrough. The fluid passage 78 extends along the longitudinal axis 46 to connect the first portion 74 and the second portion 76 of the primary fluid chamber 54 in fluid communication. The fluid passage 78 may be configured in any suitable manner, and may include a valve (not shown) and/or other components capable of regulating the flow of the fluid 62 between the first portion 74 and the second portion 76 of the primary fluid chamber 54. It should be appreciated that as the casing 52 moves toward the first end 48 of the rod 44, the first portion 74 of the primary fluid chamber 54 increases in volume and the second portion 76 of the primary fluid chamber 54 decreases in volume. As this change in volume occurs, the fluid 62 is forced from the second portion 76 into the first portion 74 through the fluid passage 78. Similarly, as the casing 52 moves toward the second end 50 of the rod 44, the second portion 76 of the primary fluid chamber 54 increases in volume and the first portion 74 of the primary fluid chamber 54 decreases in volume. As this change in volume occurs, the fluid 62 is forced from the first portion 74 into the second portion 76 through the fluid passage 78. The flow rate of the fluid 62 through the fluid passage 78 regulates the damping capacity of the damper assembly 42.

The rod 44 includes an annular wall 80. The annular wall 80 extends along the longitudinal axis 46, and defines a first expansion chamber 82 and a second expansion chamber 84. Both of the first expansion chamber 82 and the second expansion chamber 84 extend along the longitudinal axis 46. The first expansion chamber 82 extends between the first end 48 of the rod 44 and the piston 72. The second expansion chamber 84 extends between the second end 50 of the rod 44 and the piston 72. The first expansion chamber 82 is generally disposed within the first portion 74 of the primary fluid chamber 54, and the second expansion chamber 84 is generally disposed within the second portion 76 of the primary fluid chamber 54. However, it should be appreciated that a portion of the first expansion chamber 82 and the second expansion chamber 84 may extend outward beyond the first portion 74 and the second portion 76 of the primary fluid chamber 54 respectively.

The annular wall 80 of the rod 44 further defines a first expansion port 86 and a second expansion port 88. The first expansion port 86 extends radially through the annular wall 80 of the rod 44 to connect the first expansion chamber 82 and the primary fluid chamber 54 in fluid communication. The second expansion port 88 extends radially through the annular wall 80 of the rod 44 to connect the second expansion chamber 84 and the primary fluid chamber 54 in fluid communication. As shown in FIG. 2, the first expansion port 86 connects the first portion 74 of the primary fluid chamber 54 and the first expansion chamber 82 in fluid communication, and the second expansion port 88 connects the second portion 76 of the primary fluid chamber 54 and the second expansion chamber 84 in fluid communication. However, as shown in FIG. 3, the first expansion port 86 may alternatively connect the first portion 74 of the primary fluid chamber 54 and the second expansion chamber 84 in fluid communication, and the second expansion port 88 may alternatively connect the second portion 76 of the primary fluid chamber 54 and the first expansion chamber 82 in fluid communication.

A first pressurized gas device 90 is disposed within the first expansion chamber 82, and a second pressurized gas device 92 is disposed within the second expansion chamber 84. The first pressurized gas device 90 is compressible in response to an increase in pressure within the first expansion chamber 82. The second pressurized gas device 92 is compressible in response to an increase in pressure within the second expansion chamber 84. The first pressurized gas device 90 and the second pressurized gas device 92 may each include any suitable compressed gas device capable of compressing in response to an increase in fluid pressure of the fluid 62 and expanding in response to a decrease in fluid pressure of the fluid 62, while maintaining separation between the compressed gas and the fluid 62.

As the fluid 62 heats during use, the fluid pressure of the fluid 62 within the primary fluid chamber 54 increases. As the fluid pressure increases, the fluid 62 may seep into the first expansion chamber 82 and/or the second expansion chamber 84 through the first expansion port 86 and the second expansion port 88, thereby compressing the first pressurized gas device 90 and/or the second pressurized gas device 92. Accordingly, the first expansion chamber 82 and the second expansion chamber 84 act as an overflow chamber to accommodate expansion of the fluid 62 during use, thereby preventing damage to the first cap bearing seal 58 and/or the second cap bearing seal 60, and leakage of the fluid 62 from the primary fluid chamber 54. As the fluid 62 cools, thereby decreasing the fluid pressure, the first pressurized gas device 90 and/or the second pressurized gas device 92 may then expand, forcing the fluid 62 within the first expansion chamber 82 and the second expansion chamber 84 back into the first portion 74 and the second portion 76 of the primary fluid chamber 54.

As shown in FIG. 2, the first pressurized gas device 90 and the second pressurized gas device 92 may include any suitable device. For example, as shown in FIG. 2, the first pressurized gas device 90 includes a first seal 94 moveably disposed within the first expansion chamber 82. The first seal 94 divides the first expansion chamber 82 to define a first gas portion 96 and a first fluid portion 98. The first seal 94 is configured for sealing between the first gas portion 96 and the first fluid portion 98. The first pressurized gas device 90 further includes a valve 100 disposed at the first end 48 of the rod 44, and configured for controlling a pressurized gas within the first gas portion 96 of the first expansion chamber 82. The valve 100 may include but is not limited to a shcrader valve or other similar device. Accordingly, pressurized gas may be injected into the first gas portion 96 through the valve 100 to pressurize the first gas portion 96 between the valve 100 and the first seal 94, thereby forming the first pressurized gas device 90.

As shown in FIG. 2, the second pressurized gas device 92 includes a second seal 102 moveably disposed within the second expansion chamber 84. The second seal 102 divides the second expansion chamber 84 to define a second gas portion 104 and a second fluid portion 106. The second seal 102 is configured for sealing between the second gas portion 104 and the second fluid portion 106. The second pressurized gas device 92 further includes a valve 100 disposed at the second end 50 of the rod 44, and configured for controlling a pressurized gas within the second gas portion 104 of the first expansion chamber 82. The valve 100 may include but is not limited to a shcrader valve or other similar device. Accordingly, pressurized gas may be injected into the second gas portion 104 through the valve 100 to pressurize the second gas portion 104 between the valve 100 and the second seal 102, thereby forming the second pressurized gas device 92.

Referring to FIG. 3, the first pressurized gas device 90 and the second pressurized gas device 92 are shown each including a plurality of pressurized gas filled spheres 108. A first end plug 110 is disposed within the first expansion chamber 82 at the first end 48 of the rod 44 to seal the first expansion chamber 82 and secure the gas filled spheres 108 within the first expansion chamber 82. A second end plug 112 is disposed within the second expansion chamber 84 at the second end 50 of the rod 44 to seal the second expansion chamber 84 and secure the gas filled spheres 108 within the second expansion chamber 84. It should be appreciated that the first pressurized gas device 90 and the second pressurized gas device 92 may include other embodiments, including but not limited to gas filled flexible cylindrical tubes or some other similar structure.

While the best modes for carrying out the invention have been described in detail, those familiar with the art to which this invention relates will recognize various alternative designs and embodiments for practicing the invention within the scope of the appended claims.

The invention claimed is:

1. A damper assembly for damping movement of a damper mass, the damper assembly comprising:
   a rod extending along a longitudinal axis between a first end and a second end;
   a casing disposed annularly about and in sealing engagement with the rod to define a primary fluid chamber between an interior surface of the casing and the rod;
   wherein the casing is moveable relative to the rod along the longitudinal axis;
   a piston fixedly attached to the rod and disposed within and dividing the primary fluid chamber;
   wherein the rod includes an annular wall extending along the longitudinal axis to define a first expansion chamber extending along the longitudinal axis;
   wherein the rod defines a first expansion port extending radially through the annular wall of the rod to connect the first expansion chamber and the primary fluid chamber in fluid communication;
   a first spring coupled to the rod and configured for opposing movement of the casing relative to the rod in a first direction along the longitudinal axis; and
   a second spring coupled to the rod and configured for opposing movement of the casing in a second direction along the longitudinal axis, wherein the first direction is opposite the second direction.

2. A damper assembly as set forth in claim 1 wherein the first spring and the second spring are disposed internally of and concentric with the casing.

3. A damper assembly as set forth in claim 1 wherein the first spring and the second spring are disposed externally of and concentric with the casing.

4. A damper assembly as set forth in claim 1 further comprising a mass attached to and moveable with the casing.

5. A damper assembly as set forth in claim 1 wherein the casing includes a first cap bearing seal disposed approximate the first end of the rod and configured for slideably supporting and sealing the casing relative to the rod, and a second cap bearing seal disposed approximate the second end of the rod and configured for slideably supporting and sealing the casing relative to the rod.

6. A damper assembly as set forth in claim 1 further comprising a first pressurized gas device disposed within the first expansion chamber and compressible in response to an increase in pressure within the first expansion chamber.

7. A damper assembly as set forth in claim 6 further comprising a first seal moveably disposed within the first expansion chamber and dividing the first expansion chamber to define a first gas portion and a first fluid portion, with the first seal configured for sealing between the first gas portion and the first fluid portion.

8. A damper assembly as set forth in claim 1 wherein the piston divides the primary fluid chamber to define a first portion of the primary fluid chamber and a second portion of the primary fluid chamber.

9. A damper assembly as set forth in claim 8 wherein the annular wall of the rod defines a second expansion chamber extending between the second end of the rod and the piston.

10. A damper assembly as set forth in claim 9 wherein the first expansion chamber is generally disposed within the first portion of the primary fluid chamber, and the second expansion chamber is generally disposed within the second portion of the primary fluid chamber.

11. A damper assembly as set forth in claim 10 wherein the rod defines a second expansion port extending radially through the annular wall of the rod to connect the second expansion chamber and the primary fluid chamber in fluid communication.

12. A damper assembly as set forth in claim 11 wherein the first expansion port connects the first portion of the primary fluid chamber and the first expansion chamber in fluid communication, and wherein the second expansion port connects the second portion of the primary fluid chamber and the second expansion chamber in fluid communication.

13. A damper assembly as set forth in claim 11 further comprising a second pressurized gas device disposed within the second expansion chamber and compressible in response to an increase in pressure within the second expansion chamber.

14. A damper assembly as set forth in claim 13 further comprising a second seal moveably disposed within the second expansion chamber and dividing the second expansion chamber to define a second gas portion and a second fluid portion, with the second seal configured for sealing between the second gas portion and the second fluid portion.

15. A damper assembly as set forth in claim 1 wherein the piston includes at least one fluid passage extending therethrough along the longitudinal axis to connect the first portion and the second portion of the primary fluid chamber in fluid communication.

16. A suspension system for a vehicle, the suspension system comprising:
a knuckle;
a wheel assembly rotatably supported by the knuckle;
a damper assembly coupled to the knuckle and configured for damping vertical movement of the wheel assembly, wherein the damper assembly includes:
a rod extending along a longitudinal axis between a first end and a second end, wherein each of the first end and the second end of the rod are fixedly attached to the knuckle;
a casing disposed annularly about and in sealing engagement with the rod to define a primary fluid chamber between an interior surface of the casing and the rod, wherein the casing is moveable relative to the rod along the longitudinal axis;
a fluid disposed within the primary fluid chamber;
a mass attached to and moveable with the casing;
a first spring coupled to the rod and configured for opposing movement of the casing and the mass relative to the rod in a first direction along the longitudinal axis, and a second spring coupled to the rod and configured for opposing movement of the casing and the mass in a second direction along the longitudinal axis, wherein the first direction is opposite the second direction;
a piston fixedly attached to the rod and disposed within and dividing the primary fluid chamber to define a first portion of the primary fluid chamber and a second portion of the primary fluid chamber;
wherein the piston includes at least one fluid passage extending therethrough along the longitudinal axis to connect the first portion and the second portion of the primary fluid chamber in fluid communication;
wherein the rod includes an annular wall extending along the longitudinal axis to define a first expansion chamber extending along the longitudinal axis between the first end of the rod and the piston, and to define a second expansion chamber extending along the longitudinal axis between the second end of the rod and the piston;
wherein the rod defines a first expansion port extending radially through the annular wall of the rod to connect the first expansion chamber and the first portion of the primary fluid chamber in fluid communication, and defines a second expansion port extending radially through the annular wall of the rod to connect the second expansion chamber and the second portion of the primary fluid chamber in fluid communication;
a first pressurized gas device disposed within the first expansion chamber and compressible in response to an increase in pressure within the first expansion chamber; and
a second pressurized gas device disposed within the second expansion chamber and compressible in response to an increase in pressure within the second expansion chamber.

17. A suspension system for a vehicle as set forth in claim 16 further comprising a first seal and a second seal, wherein the first seal is moveably disposed within the first expansion chamber and divides the first expansion chamber to define a first gas portion and a first fluid portion, with the first seal configured for sealing between the first gas portion and the first fluid portion, and wherein the second seal is moveably disposed within the second expansion chamber and divides the second expansion chamber to define a second gas portion and a second fluid portion, with the second seal configured for sealing between the second gas portion and the second fluid portion.

18. A suspension system for a vehicle set forth in claim 16 wherein the casing includes a first cap bearing seal disposed approximate the first end of the rod and configured for slideably supporting and sealing the casing relative to the rod, and a second cap bearing seal disposed approximate the second end of the rod and configured for slideably supporting and sealing the casing relative to the rod.

* * * * *